B. W. TUCKER.
TYPE WRITING MACHINE.
APPLICATION FILED FEB. 21, 1914. RENEWED OCT. 17, 1916.

1,222,497.

Patented Apr. 10, 1917.
5 SHEETS—SHEET 1.

Witnesses:
C. Bartels.
C. Ott.

Inventor
B. W. Tucker
By his Attorneys
Criswell & Criswell

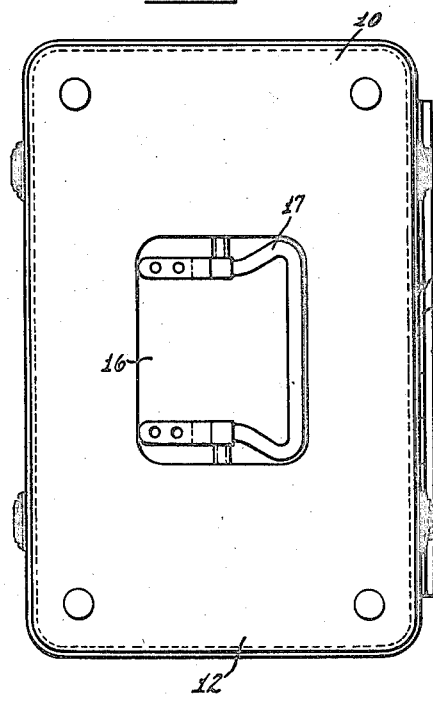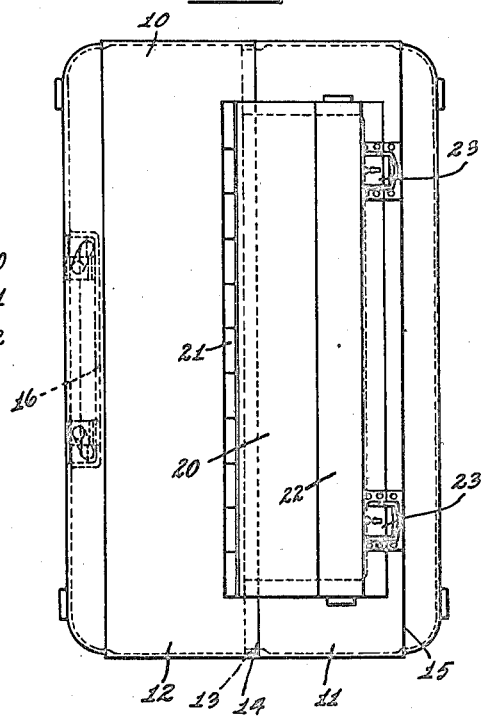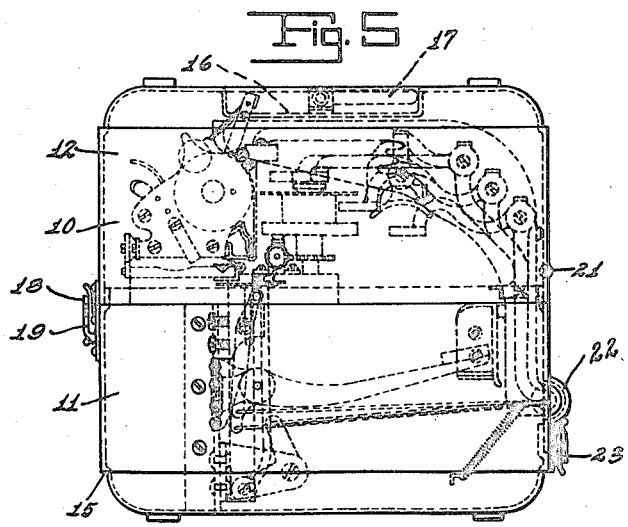

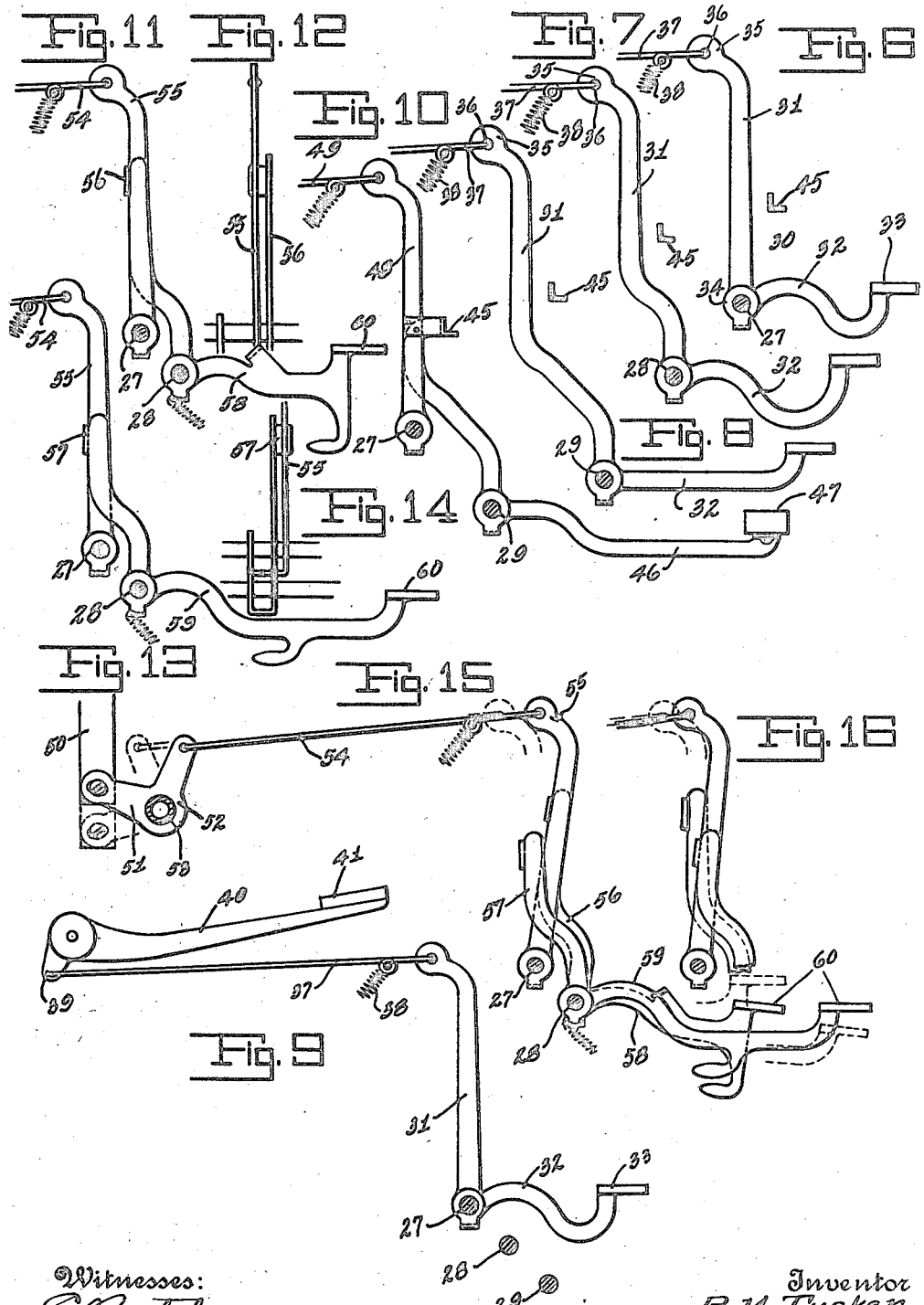

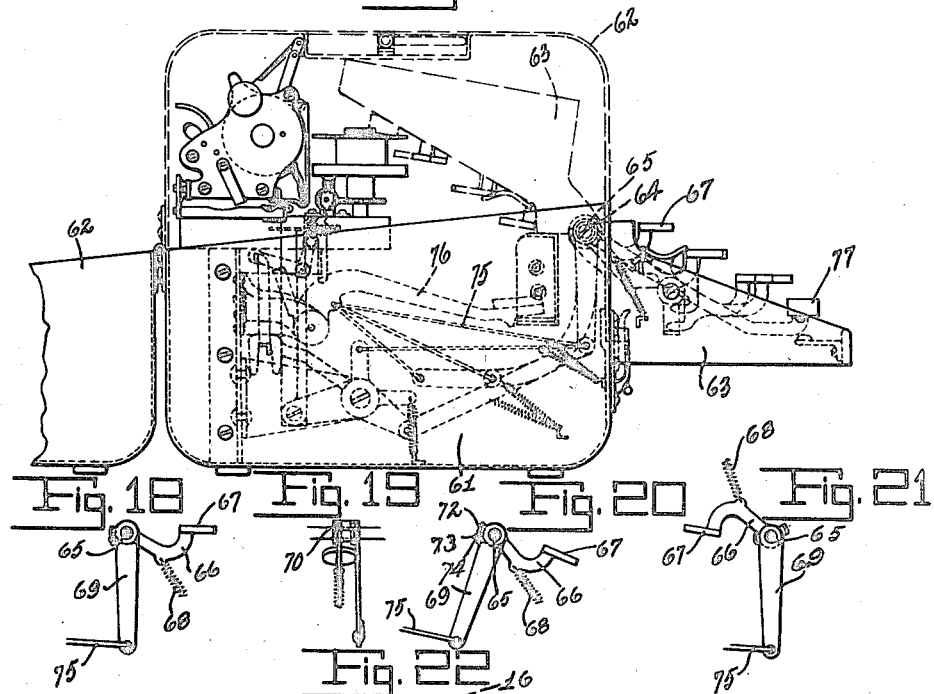
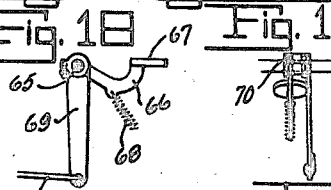
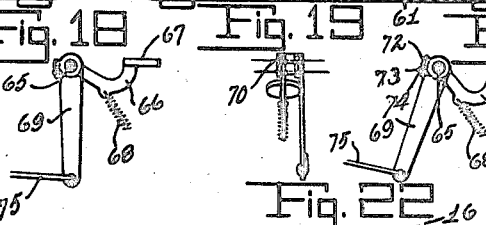
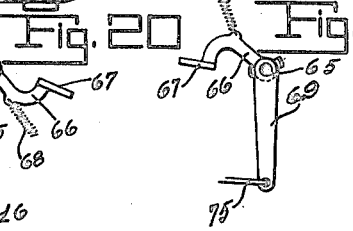
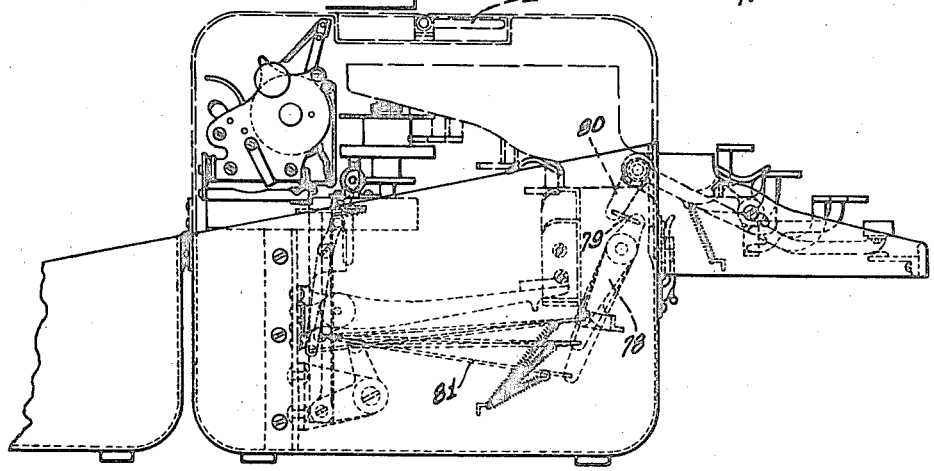

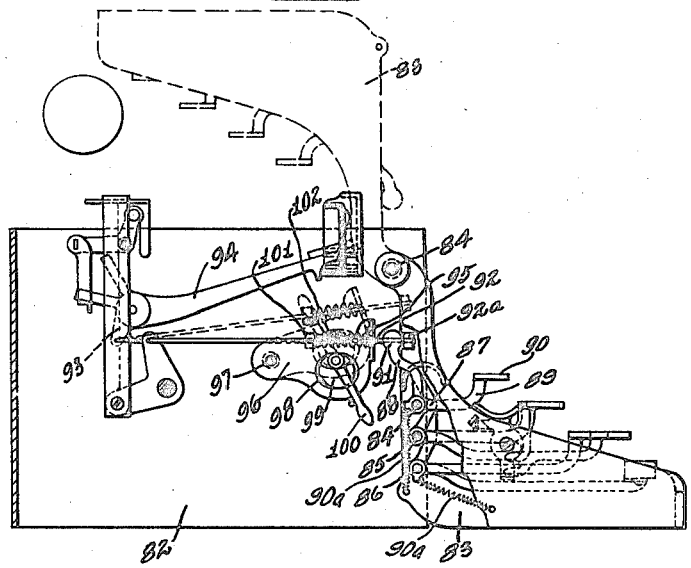

UNITED STATES PATENT OFFICE.

BENJAMIN W. TUCKER, OF SOUTH ORANGE, NEW JERSEY, ASSIGNOR TO CORONA TYPE-WRITER COMPANY, INCORPORATED, A CORPORATION OF NEW YORK.

TYPE-WRITING MACHINE.

1,222,497.        Specification of Letters Patent.      Patented Apr. 10, 1917.

Application filed February 21, 1914, Serial No. 820,244. Renewed October 17, 1916. Serial No. 126,185.

*To all whom it may concern:*

Be it known that I, BENJAMIN W. TUCKER, a citizen of the United States, and a resident of South Orange, county of Essex and State of New Jersey, have invented certain new and useful Improvements in Type-Writing Machines, of which the following is a full, clear, and exact description.

This invention relates more particularly to visible or front-strike typewriting machines in which the keyboard and platen carriage are brought into close relation when not in use for the purpose of making the same compact to adapt the machine for transportation and other purposes.

In machines of this character as ordinarily constructed and in which a standard or universal keyboard is employed, the machine has its frame so made that the keyboard and platen carriage may be brought into close relation to each other but such a machine when transported requires a separate and independent case in which the machine is placed for transportation or storage purposes and to protect the machine during such transportation from dust and injury.

The principal object of the present invention is to provide a typewriting machine in which the inclosing case forms the frame and support for the mechanism and parts of the typewriter, and which is of such a construction and a part thereof is so arranged that a standard or universal keyboard may be mounted thereon but connected to operate the usual typewriter mechanism, and when not in use the member of the case with the keyboard including the spacing and shift keys may be folded upward and rearward to make the machine compact and to adapt the mechanism to be inclosed within the case.

Another object of the invention is to provide a universal keyboard including spacing and shift keys and which may be mounted upon a foldable part or member forming a part of the inclosing case or as a part independent of the case.

Other objects of the invention are to provide a case forming a support for the parts of a typewriting machine which are so constructed that the machine may be entirely closed and in a more compact condition than when in use; to provide a case which may have a part serving as a cover and hinged to the main part or separate therefrom and adapted to form a part of the support when the machine is in use; and to provide a casing and support which will permit a universal keyboard to be folded upward and inward so as to substantially overhang the type-bars or platen carriage of the machine and to be located within the case when not in use.

A further object of the invention is to provide a construction wherein a break joint connection may be made between the keyboard which is foldable and the non-folding part, or in which the keyboard may be folded and still a positive connection maintained between the parts operated by the keyboard and the keyboard itself, and which mechanism may be mounted directly on or within the case or in a skeleton frame in which the parts may be assembled and then mounted within the case so as to form a permanent part thereof.

With these and other objects in view, the invention will be hereinafter more particularly described with reference to the accompanying drawings, which form a part of this specification, and will then be pointed out in the claims at the end of the description.

In the drawings, Figure 1 is a plan view of one form of machine embodying the invention showing a construction wherein the cap or top of the case is detachable and is adapted to be attached to the base or body of the casing in such a way as to form a part of the support.

Fig. 3 is a plan view of the case with the machine inclosed ready for transportation or storage purposes.

Fig. 4 is a front view.

Fig. 5 is a side view of the parts inclosed within the case as shown in Figs. 3 and 4.

Figs. 6, 7, 8 and 9 are views showing the key-operated levers for moving the type-bars.

Fig. 10 is a detail view, partly in section, of the spacing action.

Figs. 11 to 16 are views showing parts of the platen shift mechanism.

Fig. 17 differs mainly from the construction shown in Figs. 1 to 16 in that the casing has a top member hinged to the base member to provide a connection whereby the key-levers exert a push action upon the type-bars instead of a pull thereon as in the other figures.

Figs. 18 to 21 are different views of the key action.

Fig. 22 is somewhat similar to the construction shown in Fig. 17 except that auxiliary levers are employed whereby a pull is exerted on the type-bars and other parts instead of a push as in Figs. 1 to 17.

Fig. 23 shows a form of key action in which there is a break joint instead of a positive connection being always maintained, the said mechanism being mounted upon an independent frame or in the case to form a permanent part thereof; and Fig. 24 shows a different form of mechanism from that shown in Fig. 23 and in which a push action is obtained instead of a pull as in Fig. 23.

Figure 1:
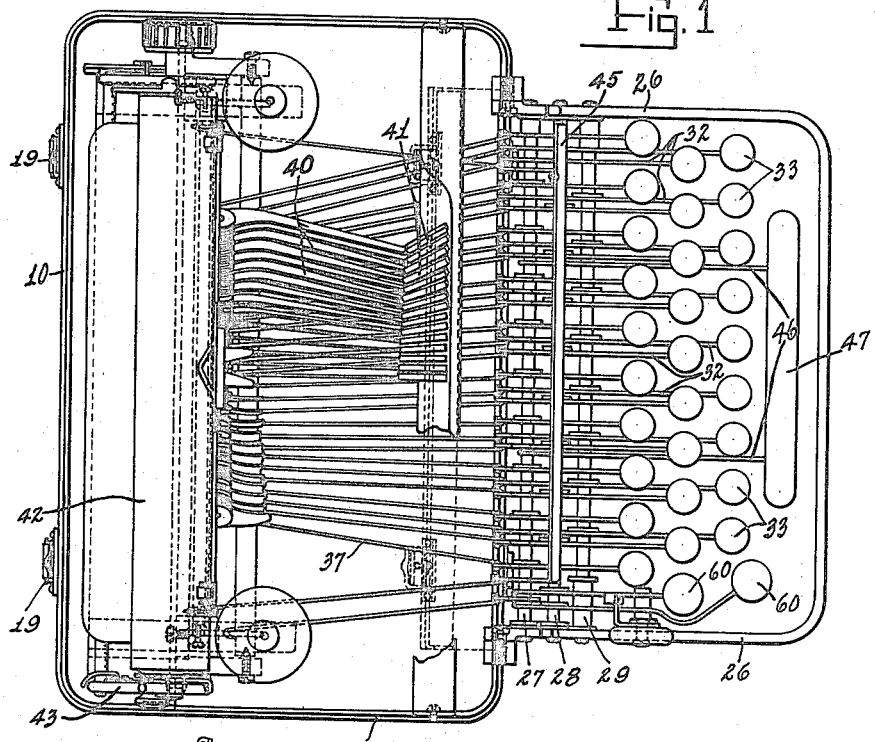
Figure 2:
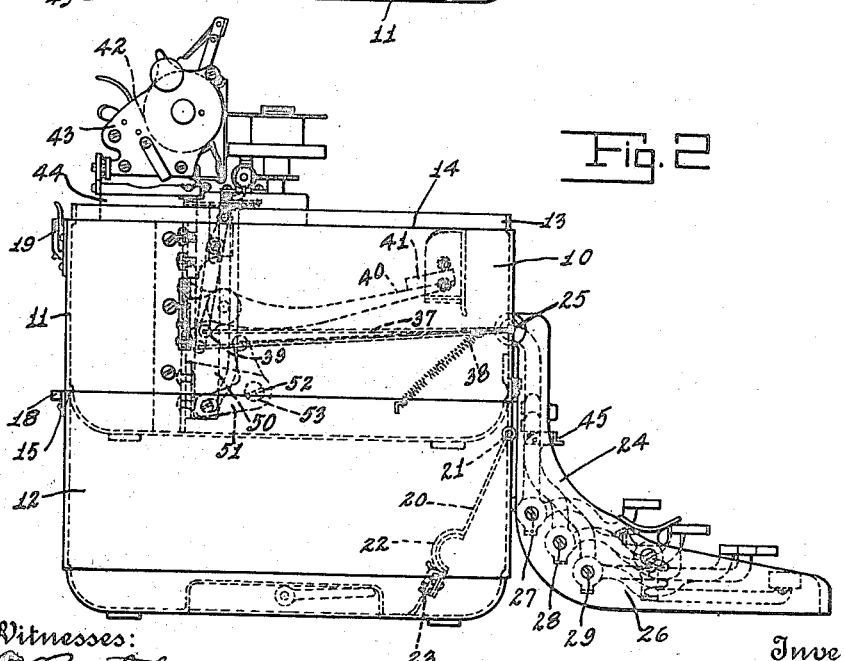
Fig. 2 is a side elevation of the machine in position for use.

The case 10 has a base or main member or section 11 and a top section or member 12. The top section 12 is detachable from the bottom or base section 11 and is adapted to fit partly over said base section at the lower end thereof to form an extension and support as shown in Fig. 2. The section 11 is reduced, as at 13, at the upper edge thereof to provide a flange 14 about said section, and at the lower part is also reduced to provide a flange 15 to form seats for the open end of the top section 12 when the latter is placed in the position shown in Fig. 5 to complete the case or when detached when the machine is to be used and employed as a part of the support as in Fig. 2. The top section 12 is provided with a recessed part 16 in which is arranged a handle 17 to permit the machine to be readily transported and carried around, and said section at the rear portion thereof is provided with tongues or engaging parts 18 which are adapted to be held by means of clips 19 arranged at the upper portion of the main section 11 and at the rear thereof. The top section 12 is also provided with a flap or part 20 which is hinged, at 21, to the front part of the top section and has a curved or notched part 22 adapted to fit about a hinge to be presently described and with fastening means, as 23, to hold the flap section 20 against accidental detachment when the case is in the position shown in Figs. 3 to 5. This flap or leaf portion is adapted to close the front of the case to protect the same when the keyboard and mechanism is inclosed within the case as shown in Fig. 5, and which permits the keyboard, to be presently described, to be moved outward in position to make the same accessible and ready for use as shown in Figs. 1 and 2.

A keyboard frame member 24 is hinged at the upper portion thereof, at 25, between the sides of the main section or member 11 of the case somewhat below the central portion thereof and is suspended from this hinged portion so that when in use the rear part of the frame member 24 or keyboard support rests at the rear part thereof against the sections 11 and 12 as shown in Fig. 2. The keyboard support or frame 24 is substantially L-shaped in side elevation and between the sides 26 thereof are a plurality of transversely extending rods 27, 28 and 29. These rods or supports are arranged in parallel relation one in advance of the other in different horizontal planes. Each rod or support has a bank or set of key-levers 30 pivotally held thereto. These key-levers, Figs. 6 to 9, are substantially bell-crank shaped in form and each have an upright arm 31 and a horizontal arm 32 on the outer end of which is a key or finger portion 33. Each lever has a bearing 34 of sufficient width along its supporting rod to provide a central bearing therefor and to adapt the key-levers to be self-spacing. Each arm 31 of the key-levers is provided with a lug 35 having an aperture 36 therein in one end of which is held a link 37 so that each link and the key-lever by reason of the pivotal connection through the aperture 36 may be folded with respect to each other. The apertures 36 of the key-levers 31 are normally in alinement with the hinges or pivots 25 of the keyboard frame member 24 so that the said key-levers may fold therewith with the links as a pivot when it is desired to place the keyboard with its supporting frame within the case as shown in Fig. 5. The links 37 are normally forced in one direction by springs 38 and at the inner ends of said links are each connected to a lug 39 of a type-bar 40 so that as each key-lever is depressed, the type-bar will be given an upward and rearward movement. Each type-bar has a type block or head 41 on which a plurality of characters may be arranged, the said characters being adapted to be impressed upon the work sheet arranged about the platen 42 at each operation of the key-levers.

The platen 42 is mounted upon a carriage 43 and is suitably guided upon a bed arranged upon vertically movable arms or bars 44. The type-bars are suitably alined at the printing point and there is suitable ribbon mechanism by which a ribbon may be moved lengthwise of the carriage and transversely thereof to adapt the writing to be seen immediately the printing takes place, or to permit the ribbon to remain inactive for stenciling purposes. There is also a suitable escapement mechanism which may be of the usual or any preferred construction to adapt the carriage to be moved for letter-spacing but such escapement mechanism as well as the ribbon mechanism, line-spacing and certain other features of the machine form no part of the present invention and are therefore not shown or described in detail. Only the universal bar 45 is illustrated and this bar is connected to move the escapement mechanism for letter-spacing in the usual way. The universal bar is positioned so as to be operated by the key action at each depression of one of the key-levers and also by the spacing levers 46 on the other end of which is the space bar 47. The spacing levers 46 are pivotally mounted on the transverse rod 29 and are connected at their upper ends to operate the arms 48. The arms 48 are connected to the universal bar and are supported on the transverse rod 27 and said arms are connected by a link 49 or otherwise to operate the escapement mechanism.

A platen shift mechanism is provided for moving the platen carriage vertically to adapt a plurality of characters to be placed on each type head. If each type head has only two characters thereon, a single shift lever may be employed, but if three characters are used on each type head, one for upper case and the other for lower case and one for figures and similar characters, then two platen shift levers are employed. As shown, the type heads or blocks are intended to have three characters and therefore two platen shift levers adapted to move the platen carriage to different elevations are shown. The bars or arms 44 to which the carriage bed may be held are mounted upon vertically extending slides or posts 50 on the upper ends of which are the bars 44. These posts are located at the rear corners of the case within the main member 11 and may be connected by a rod or otherwise at the upper portion thereof, and at the lower portion may be connected to one arm, as the arm 51, of a bell-crank lever 52. There may be two bell-crank levers, one at each side of the machine and one for each slide 50, and these bell-crank levers may be held to be moved in unison by a tube or rod 53 so that if one bell-crank lever 52 is operated, the two posts are moved at the same time and uniformly to properly position the platen carriage. A link 54 is connected at one end to one arm of the bell-crank lever 52 and at its other end to an arm 55 so as to form a hinge connection therewith similar to the connection between the links 37 and the key-levers 30 of the key action. The arm 55 is pivotally held to the transverse rod 27 and is engaged by the arms 56 and 57 of bell-crank platen shift levers 58 and 59 respectively. These platen shift levers are of bell-crank form and at their outer ends are connected to keys 60. The arms of the platen shift levers are of relatively different lengths so that one lever, as the lever 57, will impart a less movement to the arm 55 as shown in Fig. 16 than when the arm 56 is operated as shown in Fig. 15, thereby imparting different throws to the platen carriage to adapt different types to print.

Figs. 17 to 21 show a form of typewriting machine in which the case comprises a base section 61 and a top section or member 62 which is hinged at the upper edge and at the rear of the section 61 so as to be folded thereover when the machine is to be compact and for transportation purposes as shown in dotted lines in said figure. As in the other form, a keyboard frame or support 63 is provided which is hinged, as at 64, between the sides of the main member 61 and is adapted to be folded upward and over the main member 61 as shown in dotted lines. The member 63 forms a support for the universal or standard keyboard which consists of the key-levers of the key action, the spacing key-levers, and the platen shift levers. In this form of machine the key-levers are supported on a single rod 65 and each key-lever consists of two parts. One part 66 has a key 67 and is normally forced in one direction by a spring 68. The inner end of the part or lever 69 is held to move freely about the rod 65 as a pivot and in such a way that the part 66 may be folded or moved upward as shown in Fig. 21 when the machine is in a folded condition. The part 69 of the key-lever consists of a single arm with a U-shaped part 70 forming a bearing therefor and having a projection 72 thereon, while the part or lever 66 also has a U-shaped part 73 forming a bearing for the lever or part 66 but which is adapted to fit within the U-shaped part 70 of the arm 69. A projection 74 may be formed integral with each lever 66 so that when the lever 66 is depressed the projection 74 will engage the projection 72 on the arm 69 and will move the same on its pivot about the rod 65, and when the key-lever 66 with the keyboard is to be folded, the projection 74 will move away from the projection 72 independent of any movement on the part of the arm 69 as shown in Fig. 21. The arms 69 are each connected to a link 75 and each link is connected at its inner end to a type-bar 76 by which the said type-bar may be moved upward and rearward as each key-lever is depressed as already described.

It will be evident that the spacing levers connected by the transverse spacing bar 77 may be also mounted on the transverse rod 65 and also the platen shift levers likewise mounted and connected to the parts operated thereby so that said shift levers as well as the spacing levers may be folded with the frame or part 63.

In Fig. 22, the construction is substantially the same as shown in Fig. 17 except that auxiliary levers 78 are connected by links 79 to arms 80 operated by the key-levers and spacing and shift levers. The levers 78 at their lower ends are connected by links 81 so that instead of a push action being given to the type-bars, the said type-bars have a pulling action given thereto through the links 81.

Fig. 23 shows how a break joint connection may be made between the key-levers and the type-bars without any auxiliary lever whatever. This construction of mechanism may be employed in connection with any of the forms of cases already described or in connection with any suitable frame or mounting therefor. A frame member 82 which may be permanently mounted in an inclosing case or as a separate part, has a member 83 hinged or pivoted at 84 thereto so as to adapt the member 83 to be folded upward and rearward as shown in dotted lines. Between the sides of the member 83 are held a plurality of transversely extending rods 84, 85 and 86. These rods may be arranged one above the other to adapt the same to support different banks or sets of key-levers. As shown there are three sets or banks of key-levers as in the other forms described and each key-lever 87 is substantially bell-crank in form having a vertical arm 88, and a horizontal arm 89, the latter being provided with a key or finger portion 90. These key-levers may be held in their normal position by suitable springs 90$^a$ and at their upper ends may be bifurcated, as at 91, to span the outer end of a rod or link 92. Each rod or link, there being one for each key-lever and type-bar, may have a collar or boss 92$^a$ thereon against which the upper end of one of the key-levers may engage to impart a lengthwise movement to the link. The link or rod of each key-lever extends inward and at the inner end is connected to a lug 93 projecting inward from its coöperating type-bar 94 which may be supported and held in substantially the manner already described. The links 92 are supported in a transversely extending bar or plate 95 and this plate may be held to an arm or arms 96 which are pivoted at 97 between the sides of the frame member or support 82. An opening is provided in one of the arms 96, as at 98, and arranged in said opening is an eccentric 99 to which is held a lever or handle 100 so that by moving the lever 100 to the position shown in dotted lines, the arms 96 may be also moved to the dotted line position to carry the plate 95 and the links or rods 92. This operation will remove the rods or links 92 from the bifurcated ends 91 of the key-levers so that the key-levers with the supporting frame 83 may be moved to the dotted line position and when restored to their normal working position the links may be in the position shown in full lines so as to be in operative connection therewith. Each link 92 has a collar 101 thereon and interposed between the collar and the plate 95 is a spring 102 tending normally to retain the link as well as its type-bar in their normal position. The platen shift levers as well as the spacing levers may be similarly mounted and connected by links to the parts operated thereby so that the spacing and shift levers may be folded with the key-levers. By this arrangement auxiliary means of any kind is dispensed with so that there is a direct and positive as well as a break connection between the key-levers and the type-bars as well as the parts operated by the platen shift and spacing levers.

Fig. 24 shows a construction wherein a push action is given to the type-bars instead of a pulling action as shown in Fig. 23. The key-levers 103 are mounted upon a plurality of rods 104 carried by a frame member or support 105, the latter being hinged at 106 to the frame member or support 107. The key-levers as well as the spacing and shift levers have downwardly extending arms 108 of relatively different lengths and these arms are adapted to operate links 109 connected to the type-bars 110 or other means operated thereby. The links are carried at their outer ends by sets of arms 111 which are mounted upon transversely extending rods, and said arms are normally forced in one direction by means of springs 112. It will be seen that the member 105 with the key-levers as well as the spacing and shift levers may be folded upward and rearward in the position shown in dotted lines, thereby making a break connection between the key-levers and the links and parts operated thereby.

It will be understood that in providing a casing which may be made to fold, the casing may be variously constructed to adapt the mechanism to be mounted thereon and may be so constructed that a universal or standard key-board may be employed to operate the parts mounted on the non-folding member or part of the casing.

While I have shown special constructions of machines and type-actions therefor, in Figs. 17 to 24 inclusive, such features are not specifically claimed herein but form subject matter of separate applications filed by me.

From the foregoing, it will be evident that simple and efficient means is provided whereby a visible type-writing machine may be employed which has means for mounting the mechanism and parts on a permanent part of the machine; that simple mechanism is provided whereby a universal keyboard may be employed; and that simple means is provided whereby either a positive connection may be maintained between the keyboard levers and the means operated thereby or a break joint connection made therewith.

Having thus described my invention, I claim as new and desire to secure by Letters Patent:—

1. In a visible typewriting machine in which the type-bars are each operated by a separate key-operated lever and have an upward and rearward movement and in which the platen carriage always remains in the path of movement of the type-bars, a case forming a support for the platen carriage and comprising a main section, a top section, and a supporting keyboard member hinged to the main case section and forming a support for a universal keyboard including type-bar operating key-levers, spacing and platen shift levers, said keyboard support being adapted to fold upward and rearward into close relation to the platen carriage to make the machine more compact and adapted to be inclosed within the top section of the case when the latter is in its transporting condition.

2. In a visible typewriting machine in which the type-bars are each operated by a separate key-operated means and in which the platen carriage always remains in the path of movement of the type-bars, a case forming a support for the platen carriage and comprising a main section, and a supporting keyboard member hinged to the main case section and forming a support for a universal keyboard including type-bar operating keys, spacing and platen shift levers, said keyboard support being adapted to fold upward and rearward into close relation to the platen carriage to make the machine more compact and adapted to be inclosed within the case when the latter is in its transporting condition.

3. In a visible typewriting machine in which the type-bars are each operated by separate key-operated levers, a case forming a support for the platen carriage and comprising a main member, a cover, and a supporting keyboard member hinged to the main member and forming a support for a universal keyboard including type-bar operating key-levers, spacing and platen shift levers, said keyboard being adapted to be brought into close relation to the platen carriage to make the machine compact and to be entirely inclosed within the case.

4. In a visible typewriting machine in which the type-bars are each operated by separate key-operated means and have an upward and rearward movement and in which the platen carriage always remains in the path of movement of the type-bars, a case forming a support for the platen carriage and comprising a main section, a top section, and a supporting keyboard member hinged to the main case section and forming a support for the type-bar operating key-levers.

5. In a visible typewriting machine in which the type-bars have an upward and rearward movement, a case comprising a main section forming a support for the platen carriage and type-bars, a detachable top section adapted to be held to the main section at either the upper or lower portion thereof, in the former position serving as an inclosing top and in the latter position as an extension of the main section and as a support for the mechanism contained in the said main section, a support for a universal keyboard adapted to fold upward and rearward within the inclosure formed by the main section and in close relation to a platen carriage, and means whereby the top section and main section may be held together.

6. In a visible typewriting machine in which the type-bars and platen carriage always remain in coöperative relation, a case comprising a main section, a detachable section adapted to be held to the main section at either the upper or lower portion thereof in the former position serving as an inclosing cover and in the latter position as an extension of the main section and as a support for the mechanism contained in the said main section, and a support for a keyboard adapted to fold upward and rearward within the inclosure formed by the main section and in close relation to a platen carriage.

7. In a visible typewriting machine having type-bars each operated by separate key-operated means, an inclosing supporting case comprising a cover and a plurality of members adapted when open to be in a normal working position and when closed to be compact, a part of said case serving as a support for a platen carriage and type-bar and another part for a standard keyboard, all of which are adapted to be inclosed within the case.

8. In a visible typewriting machine having type-bars each operated by separate key-operated means, an inclosing case forming a part of the typewriting machine and having main and cover members and adapted when open to be in normal working position and when closed to be compact, said case serving as a support for a platen carriage, type-bars and a standard keyboard, the said keyboard and platen carriage being adapted to be brought in close relation to make the machine compact when not in use.

9. In a visible typewriting machine in which the type-bars have an upward and rearward movement and are each operated by separate key-operated means, an inclosing case comprising a main section, and a top section adapted when open to be in normal working position and when closed to be compact, said case serving as a support for the type-bars and platen carriage and a standard keyboard, the latter having a break joint with the type-bars to adapt the same to be brought into compact relation to the platen carriage and type-bars and to be inclosed within the case when the machine is not in use.

10. In a visible typewriting machine, a case comprising a top section provided with a carrying handle, a main section, a support hinged to the main section and forming a support for a universal keyboard and adapted to be moved upward and rearward over the main section and within the same, and a plate member carried by the top section and having a part thereof adapted to close a portion of the main section and to fit about the hinged portion of the keyboard supporting member.

11. In a visible typewriting machine having a platen carriage and key-operated type-bars, a case comprising a top section provided with a carrying handle, a main section, a support hinged to the main section and forming a support for a universal keyboard and adapted to be moved upward and rearward over the main section and within the same and means adapted to close a portion of the main section and to fit about the hinged portion of the keyboard supporting member.

12. In a visible typewriting machine having a platen carriage and key-operated levers, a case comprising a top section and a main section adapted when open to be in normal working position and when closed to be compact, and a support hinged to the main section and forming a support for a universal keyboard and adapted to be moved upward and rearward over the main section and within the same, said keyboard comprising keys, spacing and platen shift levers.

13. In a visible typewriting machine in which there is a platen carriage and type-bars movable to a printing position, a case having main and top sections, a keyboard section pivotally held thereto and adapted to be moved upward and rearward for the purpose of making the machine more compact when not in use, said keyboard section serving as a support for a universal keyboard having means whereby a connection may be made between the same and the parts operated thereby and to be folded with the keyboard section.

14. In a visible typewriting machine in which there is a platen carriage and type-bars each operated by separate keys and movable to a printing position, an inclosing case, a keyboard section pivotally held thereto and adapted to be moved upward and rearward within the case for the purpose of making the machine more compact when not in use, said keyboard section serving as a support for a universal keyboard and foldable with the keyboard section and adapted to be entirely inclosed within the case.

15. In a visible typewriting machine in which there is a platen carriage and type-bars movable upward and rearward to a printing point and operated by separate key-operated means, a case comprising main and top sections, a keyboard section pivotally held to the main section and adapted to be moved upward and rearward for the purpose of making the machine more compact when not in use, said keyboard section serving as a support for a universal keyboard having means whereby a positive connection may be made between the same and the parts operated thereby and to be foldable with the keyboard section.

16. In a visible typewriting machine, the combination of a platen carriage, a support comprising a plurality of sections hinged together to fold and unfold, a platen carriage, type-bars, links connected to the type-bars, and keys mounted on one of the hinged sections to fold therewith and connected direct to said links.

17. In a visible typewriting machine, the combination of a platen carriage, a support comprising a plurality of relatively foldable members, a platen carriage, type-bars maintained in normal operative relation to the carriage and mounted on one of the support members, key-levers one for each type-bar mounted on another member of the support, and means forming a direct connection between the type-bars and the key-levers.

18. In a visible typewriting machine, the combination of a platen carriage, a support comprising a plurality of relatively foldable members, a platen carriage, type-bars maintained in normal operative relation to the carriage and having an upward and rearward movement, key-levers one for each type-bar mounted on another member of the support, said carriage and type-bars being mounted on one of the support members, and links forming a direct connection with the type-bars and the key-levers.

19. In a visible typewriting machine, the combination of a platen carriage, a two-part support comprising a main member and a front member hinged to the main member to fold upward and over the same, type-bars mounted on the main section, key-levers mounted on the front member, and means forming a direct connection between the type-bars and key-levers and permitting the key-levers to fold with the front member.

20. In a visible typewriting machine, the combination of a support, a platen carriage, type-bars maintained in coöperative relation to the carriage, keys foldable into compact relation to the type-bars, and means forming a direct connection between each type-bar and one of the keys.

21. In a visible typewriting machine, the combination of a support, a platen carriage, type-bars having an upward and rearward movement and maintained in coöperative relation to the platen carriage, a universal keyboard having a key lever for each type-bar and movable into compact relation thereto, and means forming a positive connection between the type-bars and the key-levers.

22. In a visible typewriting machine, the combination of a support, a platen carriage, type-bars, a universal keyboard having a key-lever for each type-bar and movable into compact relation thereto, and means forming a positive connection between the type-bars and the key-levers.

23. In a visible typewriting machine, the combination of a support, a platen carriage, type-bars, a universal keyboard having a key-lever for each type-bar and foldable into compact relation thereto when not in use, and a link forming a positive connection between each type-bar and its coöperating key-lever.

24. In a visible typewriting machine, the combination of a support, a platen, type-bars, a key-lever for each type-bar, a key-operated lever for each type-bar, and means forming a direct connection between the type-bars and key-levers and permitting said key-levers and type-bars to be brought into closer relation when not in use than when in use to make the machine compact.

25. In a visible writing machine, a number of type-bars, a key-lever for each type-bar, and a direct connection between each type-bar and key-lever permitting a relatively folding movement thereof.

26. In a visible writing machine, a number of type-bars, a universal keyboard foldable with respect to the type-bars and including spacing and platen shift levers and a direct connection between each key-lever and type-bar.

27. In a visible writing machine, a number of type-bars, a key-lever for each type-bar, and a link forming a direct connection between each type-bar and key-lever permitting a relatively folding movement thereof.

28. In a visible writing machine, a number of type-bars, a key-lever for each type-bar, a link forming a direct connection between each type-bar and key-lever and permitting a relatively folding movement thereof.

29. In a visible typewriting machine in which the type-bars move upwardly and rearwardly, a main frame member, a foldable frame member hinged to the main frame member and adapted to swing upwardly and rearwardly over the main member, a standard keyboard having key-levers pivotally held upon the foldable frame member and also provided with spacing means and shifting means, and means pivotally held to each lever and forming a hinged connection therewith adapted in their normal working position to be in alinement with the hinge of the frame members to adapt the key-levers to fold with the foldable frame member.

30. In a typewriting machine, a frame having a main frame member and a foldable frame member hinged to the main frame member and adapted to swing upwardly and rearwardly over the main member, a standard keyboard having key-levers pivotally held upon the foldable frame member and also provided with spacing means and shifting means, and a link supported on the main frame member and pivotally held to each lever and forming a hinged connection therewith adapted in their normal working position to be in alinement with the hinge of the frame members to permit the keyboard to fold with the foldable frame member and the connection with the means operated thereby maintained in both the folded and unfolded position.

31. In a visible typewriting machine in which the type-bars move upwardly and rearwardly, a frame having a main frame member and a foldable frame member hinged to the main frame member, key-operated levers pivotally held upon the foldable frame member and forming a part of a keyboard, and means pivotally held to each lever and forming a hinged connection therewith adapted in their normal working position to be in alinement with the hinge of the frame members to permit the levers to fold with the frame member and the connection with the means operated thereby maintained in both the folded and unfolded position.

32. In a visible typewriting machine having type bars each operated by separate key operated means, an inclosing case forming a part of the typewriting machine and having main and cover members adapted when open to be in normal working position and when closed to be compact, said case serving as a support for the platen, type bars and the keyboard, the said keyboard and platen being adapted to be brought in close relation to make the machine compact when not in use.

33. In a visible typewriting machine, the combination of a platen, a support comprising a plurality of sections hinged together to fold and unfold, type bars, links connected to the type bars, and keys mounted on one of the hinged sections to fold therewith and connected to said links.

34. In a visible typewriting machine, the combination of a platen, a support comprising a plurality of sections hinged together to fold and unfold, type bars, links connected to the type bars, and keys mounted on one of the hinged sections to fold therewith and operatively connected at all times to said links.

35. In a visible typewriting machine, the combination of a support, a platen, type bars maintained in coöperative relation to the platen, keys movable into compact relation to the type bars and means forming a connection between each type bar and one of the keys.

36. In a visible typewriting machine, the combination of a support, a platen, type bars maintained in coöperative relation to the platen, keys movable into compact relation to the type bars and means forming a connection between each type bar and one of the keys in the folded and unfolded positions of the keys.

37. In a typewriting machine, the combination of a support, a platen, type bars having a rearward movement and maintained in operative relation to the platen, a keyboard having a key lever for each type bar and movable into compact relation thereto, and means forming an operative connection between the type bars and keys.

38. In a typewriting machine, the combination of a support, a platen, type bars having a rearward movement and maintained in operative relation to the platen, a keyboard having a key lever for each type bar and movable into compact relation thereto, and means forming a positive connection between the type bars and the key levers in the compact and extended positions of said levers.

39. In a visible typewriting machine the combination of a support, a platen, type bars, a keyboard having a lever for each type bar and movable into compact relation thereto and means forming a connection between the type bars and the key levers in the compact and extended positions of said levers.

40. In a visible typewriting machine, the combination of a platen carriage, type bars, keys forming a part of a standard keyboard operatively connected to the type bars there being a key for each type bar, said keys being movable from an operative position to a more compact inoperative one, and links forming a direct connection between each key and its coöperating type bar and such connection maintained in both the normal and compact positions of said keys.

41. In a visible typewriting machine, the combination of a platen carriage, type bars, and key operated levers forming a part of a standard keyboard directly and operatively connected to the type bars there being a key operated lever for each type-bar, said levers being foldable relatively to the platen carriage without separation of the connecting means with said type bars.

42. In a typewriting machine, the combination of a support having two main members hinged together to fold and unfold, type bars supported upon one member, a platen carriage also supported on the same member, a key-board supported on the other member and having key-operated levers, and links directly connecting the key operated levers to the type bars and having a hinged connection with said key operated levers to permit the key operated levers to fold relatively thereto, said hinged connection of the links and the hinged connection of the members of the foldable support being in alinement.

43. In a typewriting machine, the combination of a support having members hinged together to fold and unfold, type bars supported upon one member, a keyboard supported on another member and having key operated levers, and links directly connecting the key operated levers to the type bars, said connection of the links with the key operated levers and the hinged connection of the members of the foldable support being in alinement to permit said levers during the folding movement to move about the links without disconnection.

44. In a visible typewriting machine in which the type bars are each operated by separate key operated means and have an upward and rearward movement, a platen, a case forming a support for the platen, and comprising a main section, a top section and a supporting key-board member hinged to the main case section and forming a support for the type bar operating means.

45. In a visible typewriting machine having type bars each operated by separate key operated means, an inclosing case forming a part of the typewriting machine and having main and cover members adapted when open to be extended and in working position, and when closed to be compact, said case serving as a support for the platen, type bars, and a keyboard, the said keyboard and platen being adapted to be brought in close relation to make the machine compact when not in use.

46. In a visible typewriting machine having type bars each operated by separate key operated means, an inclosing supporting case comprising a cover and a plurality of members adapted when open to be extended and in working position and when closed to be compact, a part of said case serving as a support for a platen and type-bars, and another part forming a support for the keyboard, all of which are adapted to be inclosed within the case.

47. In a compactible visible typewriting machine, the combination of a support, a platen carriage mounted thereon, a series of type-bars, a universal key-board movable from an extended working position to compact relation to the platen carriage and type-bars, and connecting means between each key and its related type-bar maintaining mechanical connection between the type-bars and keys at all times.

This specification signed and witnessed this 19th day of February, A. D. 1914.

BENJAMIN W. TUCKER.

Witnesses:
  LESTER C. TAYLOR,
  C. BARTELS.